United States Patent
Johnson et al.

(10) Patent No.: US 7,049,031 B2
(45) Date of Patent: May 23, 2006

(54) PROTECTIVE COATING ON POSITIVE LITHIUM-METAL-OXIDE ELECTRODES FOR LITHIUM BATTERIES

(75) Inventors: Christopher S. Johnson, Naperville, IL (US); Michael M. Thackeray, Naperville, IL (US); Arthur J. Kahaian, Chicago, IL (US)

(73) Assignee: The University of Chicago, Chicago, IL (US)

( * ) Notice: Subject to any disclaimer, the term of this patent is extended or adjusted under 35 U.S.C. 154(b) by 318 days.

(21) Appl. No.: 10/353,385

(22) Filed: Jan. 28, 2003

(65) Prior Publication Data

US 2003/0180615 A1    Sep. 25, 2003

Related U.S. Application Data

(60) Provisional application No. 60/352,899, filed on Jan. 29, 2002.

(51) Int. Cl.
*H01M 4/58*    (2006.01)

(52) U.S. Cl. ............ 429/231.1; 429/224; 429/231.3; 429/232; 429/231.5; 429/231.6; 252/518.1; 252/520.2; 252/520.21; 252/521.2; 423/599; 423/593.1; 423/594.5; 423/598; 423/594.15; 423/594.16; 423/600

(58) Field of Classification Search ............ 429/231.1, 429/224, 231.3, 232, 231.5, 231.6; 252/518.1, 252/520.2, 520.21, 521.2; 423/599, 593.1, 423/594.5, 598, 594.15, 600, 594.16
See application file for complete search history.

(56) References Cited

U.S. PATENT DOCUMENTS

| 5,705,291 | A  |   | 1/1998  | Amatucci et al. |
| 5,928,622 | A  | * | 7/1999  | Hwang et al. ............... 423/599 |
| 6,458,487 | B1 | * | 10/2002 | Takeuchi et al. ......... 429/231.1 |
| 6,489,060 | B1 |   | 12/2002 | Zhang et al. |
| 6,558,844 | B1 | * | 5/2003  | Howard, Jr. et al. ..... 429/231.1 |
| 2002/0141937 | A1 |   | 10/2002 | Wlimont, Jr. et al. |

OTHER PUBLICATIONS

G.G. Amatucci, A. Blyr, C. Sigala, P. Alfonse and J.M. Tarascon, Surface Treatments of . . . Spinels For Improved Elevated Temperature Performance, Solid State Ionics, 104, 13 (1997).

(Continued)

*Primary Examiner*—Laura Weiner
(74) *Attorney, Agent, or Firm*—Emrich & Dithmar LLC

(57) ABSTRACT

A positive electrode for a non-aqueous lithium cell comprising a $LiMn_{2-x}M_xO_4$ spinel structure in which M is one or more metal cations with an atomic number less than 52, such that the average oxidation state of the manganese ions is equal to or greater than 3.5, and in which $0 \leq x \leq 0.15$, having one or more lithium spine oxide $LiM'_2O_4$ or lithiated spinel oxide $Li_{1+y}M'_2O_4$ compounds on the surface thereof in which M' are cobalt cations and in which $0 \leq y \leq 1$.

13 Claims, 7 Drawing Sheets

OTHER PUBLICATIONS

J. Cho, G.B. Kim, H.S. Lim et al., Improvements of Structural Stability . . . Coating etc., Electrochemical and Solid State Letters, 2(12), 607 (1999).

S.C. Park, Y.M. Kim et al., Improvement of The Rate Capability of . . . , Journal of Power Sources, 103, 86 (2001).

J. Cho, T.J. Kim, Y.J. Kim et al., High-Performance . . . , Material, Electrochemical and Solid State Letters, 4(10), A159 (2001).

S.C. Park, Y.S. Han et al., Electrocjemical Properties of . . . Prepared by Solution-Based chemical Process, J. Electrochem. Soc. 148(7), A680 (2001).

J. Cho, T.J. Kim et al., Complete Blocking of . . . Spinel Intercalation Compound etc., Chem. Commun., 1074 (2001).

J. Cho, Correlation of Capacity Fading of . . . Measured by a Methylene Blue Adsorption, Solid State Ionics, 138, 267 (2001).

* cited by examiner

PROTECTIVE COATING ON POSITIVE LITHIUM-METAL-OXIDE ELECTRODES FOR LITHIUM BATTERIES

RELATED APPLICATIONS

This application, pursuant to 37 C.F.R. § 1.78(c), claims priority based on provisional application Ser. No. 60/352,899 filed Jan. 29, 2002.

CONTRACTUAL ORIGIN OF THE INVENTION

The United States Government has rights in this invention pursuant to Contract No. W-31-109-ENG-38 between the U.S. Department of Energy (DOE) and The University of Chicago representing Argonne National Laboratory.

FIELD OF THE INVENTION

This invention relates to positive lithium metal oxide electrodes for lithium cells and batteries, preferably rechargeable lithium-ion cells and batteries. More specifically, it relates to a lithium metal oxide electrode with a spinel-related structure with a surface coating of one or more other lithium-containing spinel oxides that are structurally compatible with, but compositionally different from the structure of the bulk lithium metal oxide electrode, to protect the bulk electrode from capacity loss effects, such as oxygen loss and manganese dissolution during the electrochemical cycling of lithium-ion cells.

BACKGROUND OF THE INVENTION

State-of-the-art lithium-ion cells have a lithiated carbon negative electrode, or anode, ($Li_xC_6$) and a lithium-cobalt-oxide positive electrode, or cathode, $Li_{1-x}CoO_2$. During charge and discharge of the cells lithium ions are transported between the two host structures of the anode and cathode with the simultaneous oxidation or reduction of the host electrodes, respectively. When graphite is used as the anode, the voltage of the cell is approximately 4 V. The cathode material $LiCoO_2$, which has a layered structure, is expensive and becomes unstable at low lithium content, i.e., when cells reach an overcharged state at $x \geq 0.5$. Alternative less expensive electrode materials that are isostructural with $LiCoO_2$, such as $LiNi_{0.8}Co_{0.2}O_2$ and $LiNi_{0.5}Mn_{0.5}O_2$ are being developed in the hope of replacing at least part of the cobalt component of the electrode. However, all these layered structures, when extensively delithiated are unstable, because of the high oxygen activity at the surface of the particles; therefore, the electrode particles tend to react with the organic solvents of the electrolyte or lose oxygen.

Spinel electrodes, such as those in the manganese-based system $Li_{1+x}Mn_{2-x}O_4$, are particularly attractive alternatives to $LiCoO_2$ because, not only are they relatively inexpensive, but they are thermally more stable than $Li_{1-x}CoO_2$ or $Li_{1-x}Ni_{0.8}Co_{0.2}O_2$ at low lithium loadings, and because they do not contribute to the impedance rise of electrochemically cycled lithium-ion cells to the same extent as $Li_{1-x}CoO_2$ or $Li_{1-x}Ni_{0.8}Co_{0.2}O_2$ electrodes.

The $Li_{1-x}[Mn_2]O_4$ spinel system has been investigated extensively in the past as an electrode for lithium-ion batteries. A major reason why the spinel system has not yet been fully commercialized is because the electrode is unstable in the cell environment, particularly if the operating temperature of the cells is raised above room temperature, for example, to 40–60° C. It is now generally acknowledged that the solubility of $Li_x[Mn_2]O_4$ electrodes in acid medium occurs by the disproportionation reaction $$Mn^{3+}_{(solid)} \rightarrow Mn^{4+}_{(solid)} + Mn^{2+}_{(solution)} \qquad (1)$$

during which the $Mn^{2+}$ ions go into solution, and the $Mn^{4+}$ ions remain in the solid spinel phase. Such a reaction can occur in lithium-ion cells because the hydrolysis of fluorinated lithium salts such as $LiPF_6$ with small amounts of residual water in the organic-based electrolyte solvents can generate hydrofluoric acid, HF.

Full electrochemical delithiation of $Li[Mn_2]O_4$ leaves $\lambda-MnO_2$ with the $[Mn_2]O_4$ spinel framework. Like many manganese dioxides, $\lambda-MnO_2$ is a powerful oxidizing agent and can be readily reduced. Therefore, any oxygen that may be evolved at the particle surface of the spinel electrode at the top of charge will result in $Mn^{3+}$ ions at the electrode surface; the instability of $Mn^{3+}$ ions at the high potential of the charged cell will also drive the disproportionation reaction (1) shown above, thus damaging the spinel surface and resulting in some irreversible capacity loss of the cell.

The presence of tetragonal $Li_2[Mn_2]O_4$ has also been observed in very small amounts at the surface of $Li[Mn_2]O_4$ spinel electrodes at the end of discharge after high rate cycling (C/3 rate) between 4.2 and 3.3 V vs. Li. The compound $Li_2[Mn_2]O_4$ in which all the manganese ions are trivalent will be unstable, like $Li[Mn_2]O_4$, at high potentials in a 1 M $LiPF_6$/EC/DMC electrolyte that contains HF, particularly if the lithium cells are operated at 40–50° C. In this case, a disproportionation reaction occurs in which MnO dissolves from the particle surface to leave an insoluble and stable $Li_2MnO_3$ rock-salt phase. This reaction may account for some of the capacity loss of 4-V Li/$Li_x[Mn_2]O_4$ cells on long-term cycling.

Substantial efforts have already been made in the past to overcome the solubility problems associated with the $Li[Mn_2]O_4$ spinel electrode. For example, partial substitution of the manganese ions in $Li[Mn_2]O_4$ with a mono-, di- or trivalent ion changes the composition of the electrode and increases the average oxidation state of the manganese ions above 3.5, thus reducing the amount of $Mn^{3+}$ ions in the fully discharged electrode. Other approaches to suppress manganese dissolution from the spinel electrode have been taken, for example, by protecting the spinel particles with a surface coating, such as a low-melting lithium borate glass or a coating of $LiCoO_2$ applied at high temperature (e.g., 700–800° C.) both of which are known to be more resistant to dissolution in the electrolytes than $Li[Mn_2]O_4$. Alternatively, a coating of $ZrO_2$ or $Co_3O_4$ has been applied to the electrode particles. Although some success has been achieved by using these approaches, the problems of electrode instability have not yet been fully resolved and further improvements are necessary.

$LiMn_2O_4$ spinel electrodes have a tendency to lose oxygen or react with the electrolyte if charged to a high potential, such as 4.5 V, which causes irreversible capacity loss effects. Moreover, the loss of oxygen from the electrode can also contribute to exothermic reactions with the electrolyte and with the lithiated carbon negative electrode, and subsequently to thermal runaway if the temperature of the cell reaches a critical value. There is therefore a strong requirement to improve the state-of-the-art protective coatings on these electrodes to improve the overall performance and safety of lithium-ion cells.

SUMMARY OF THE INVENTION

This invention relates to an improved $LiMn_{2-x}M_xO_4$ positive electrode ($0 \leq x \leq 0.15$) with a spinel-related structure for non-aqueous lithium cells and batteries, preferably rechargeable lithium-ion cells and batteries. More specifically, it relates to a $LiMn_{2-x}M_xO_4$ spinel electrode with a surface coating of one or more other lithium spinel oxides $LiM'_2O_4$ or lithiated $LiM'_2O_4$ spinel oxides $Li_{1+y}M'_2O_4$ ($0<y \leq 1$) that are structurally compatible with, but compositionally different from the structure of the bulk $LiMn_{2-x}M_xO_4$ spinel electrode, to protect the spinel electrode in the bulk from capacity loss effects, such as oxygen loss and/or manganese dissolution during the electrochemical cycling of lithium-ion cells. The bulk $LiMn_{2-x}M_xO_4$ spinel electrode is comprised of the family of cation-stabilized spinels $LiMn_{2-x}M_xO_4$, in which M is one or more of any mono or multivalent cations with an atomic number less than 52, preferably with an atomic number less than 33, such as monovalent $Li^+$ or $H^+$, divalent $Mg^{2+}$ or $Co^{2+}$, trivalent $Al^{3+}$ or $Co^{3+}$, tetravalent $Ti^{4+}$ or $Zr^{4+}$, or the like, such that the average oxidation state of the manganese ions is equal to or greater than 3.5. The lithium spinel oxide or lithiated spinel oxide coatings are comprised of $LiM'_2O_4$ or $Li_{1+y}M'_2O_4$ compounds in which the M' cations are selected from one or more of lithium, cobalt, titanium or manganese, preferably lithium and/or cobalt, for example, a lithium-cobalt-oxide spinel $Li_xCo_{3-x}O_4$ ($0<x<0.4$), or alternatively, the low-temperature, lithiated-spinel form of $LiCoO_2$ (i.e., $Li_2Co_2O_4$) in which the $CoO_2$ component has a $[Co_2]O_4$ spinel-like framework. Other examples include the lithium spinel oxides $Li[Ti_{1.67}Li_{0.33}]O_4$ or $Li[Mn_{1.67}Li_{0.33}]O_4$, or their electronically-conducting Li-, Mg- or Al-substituted derivatives to induce mixed valence character to the Ti and Mn transition metal cations and hence electronic conductivity to the spinel coating.

BRIEF DESCRIPTION OF THE DRAWINGS

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

DETAILED DESCRIPTION OF PREFERRED EMBODIMENTS

Figure 1:
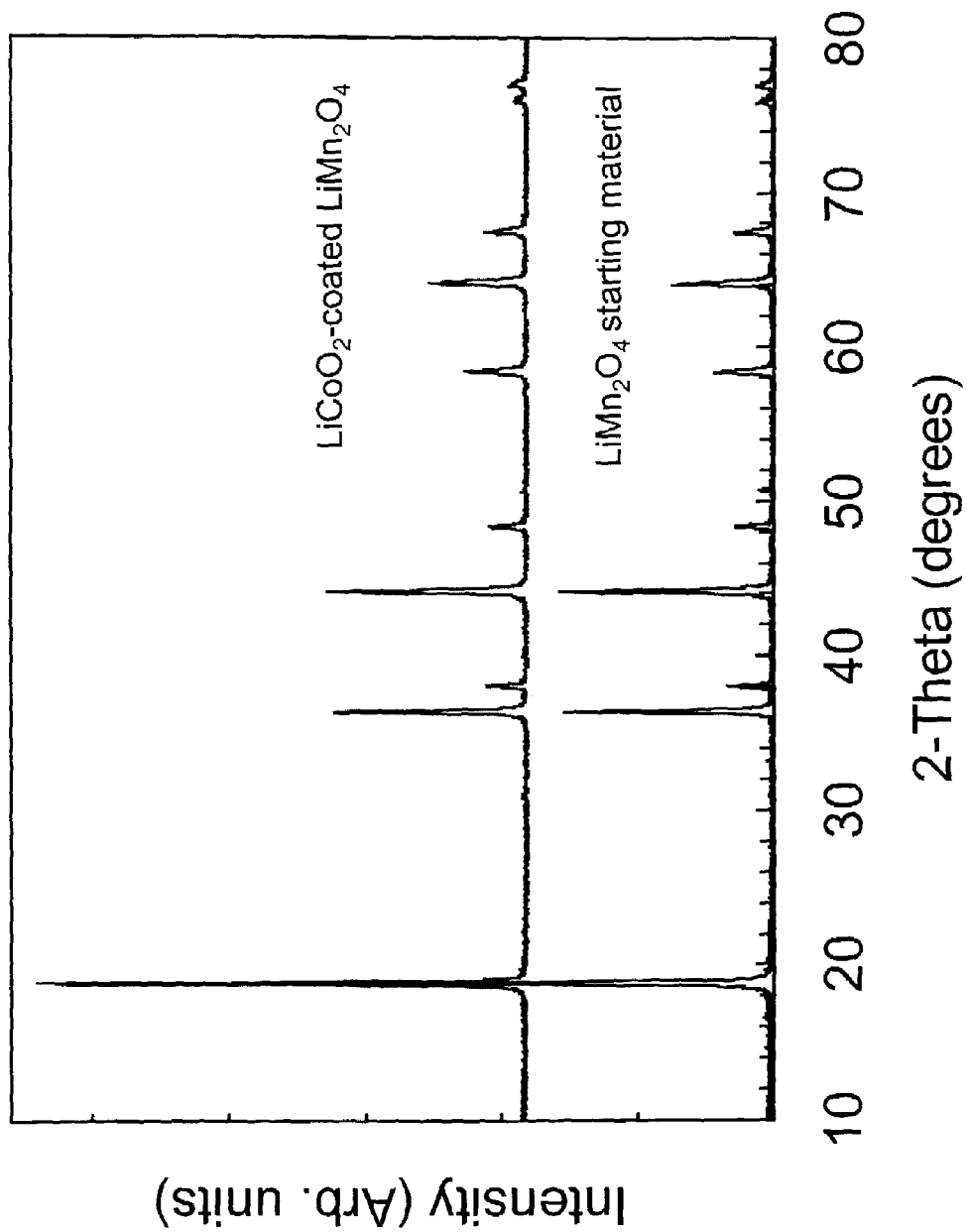
FIG. 1 depicts the powder X-ray diffraction pattern of a $Li_{1.03}Mn_{1.97}O_4$ electrode coated with a lithium-cobalt-oxide spinel, the coating prepared by a sol-gel method from lithium acetate and cobalt acetate precursors at 400° C.

This invention relates to an improved $LiMn_{2-x}M_xO_4$ spinel electrode ($0 \leq x \leq 0.15$), in which M is one or more of any mono or multivalent cations with an atomic number less than 52, preferably with an atomic number less than 33, such as monovalent $Li^+$ or $H^+$, divalent $Mg^{2+}$ or $Co^{2+}$, trivalent $Al^{3+}$ or $Co^{3+}$, tetravalent $Ti^{4+}$ or $Zr^{4+}$, or the like, such that the average oxidation state of the manganese ions is equal to, or greater than 3.5 for lithium cells and batteries, preferably rechargeable lithium-ion cells and batteries. More specifically, it relates to a $LiMn_{2-x}M_xO_4$ spinel electrode with a surface coating of one or more other lithium spinel oxides $LiM'_2O_4$ or lithiated $LiM'_2O_4$ spinel oxides $Li_{1+y}M'_2O_4$ ($0<y \leq 1$) that are structurally compatible with, but compositionally different to the structure of the bulk $LiMn_{2-x}M_xO_4$ spinel electrode, to protect the bulk spinel electrode from capacity loss effects, such as oxygen loss and/or manganese dissolution during the electrochemical cycling of lithium-ion cells.

Of particular significance to this invention is the realization that in order to achieve good binding between a surface protective coating consisting of one or more lithium-metal oxides with the lithium metal oxide structure of the bulk electrode, it is important to have a strong structural compatibility between the surface coating and the structure of the bulk electrode. Therefore, according to the invention, both the lithium metal oxide of the surface coating and the bulk electrode have spinel structures which are close-packed, preferably cubic-close-packed or approximately cubic-close-packed, with compatible crystallographic parameters that allow the structure of the coating to be fused to, or intergrown with, or connected to the structure of the bulk of the particle at the coating/bulk interface.

Attempts have been made in the past to coat $Li[Mn_2]O_4$ spinel particles with $LiCoO_2$ at high temperature, typically 800° C. At this temperature, $LiCoO_2$ has a layered structure with trigonal symmetry (R-3m, a=2.82 Å, c=14.06 Å), whereas $Li[Mn_2]O_4$ has a spinel structure with cubic symmetry (Fd-3m, a=8.24 Å). There is thus an incompatibility in structure types between the $LiCoO_2$ coating and the spinel structure of the bulk electrode, which may affect 1) the integrity of the surface layer, particularly at the surface/bulk interface during cycling and 2) its adhesion to the spinel particles. Stabilizing $Li[Mn_2]O_4$ spinel electrodes can be achieved with other spinel compounds with cubic Fd-3m symmetry or close to cubic symmetry, with lattice parameters close to that of the $Li[Mn_2]O_4$ spinel electrode. In this respect, there are a number of suitable candidate materials with a spinel structure are useful as a protective coating. One such compound is the lithiated spinel $Li_2[Co_2]O_4$ which, although having the same formula as layered $LiCoO_2$, has a different structure; $Li_2[Co_2]O_4$ can be synthesized at a lower temperature than layered $LiCoO_2$, typically at 400° C. or lower. For example, the lattice parameter of a $Li_{1-x}[Mn_2]O_4$ electrode changes from 8.24 to 8.03 Å for the range $0<x<1$. The lithiated spinel $Li_2[Co_2]O_4$ has a lattice parameter of approximately the same dimension (8.00 Å), and this parameter does not change significantly on lithium extraction to the stoichiometric spinel composition $Li[Co_2]O_4$. Thus, according to the invention, the cobalt spinel has suitable structural characteristics for the protective layer. Furthermore, it is known that $LiCoO_2$ materials can be fabricated at moderate temperatures (e.g., between 400 and 500° C. with a cation distribution which is intermediate between that of layered-$LiCoO_2$ and lithiated-spinel $LiCoO_2$ ($Li_2[Co_2]O_4$). The applicants believe that such intergrown materials with spinel-related character provide greater stability than the structures with the ideal spinel arrangement of cations. The invention also includes lithium-substituted cobalt oxide spinels $Li_xCo_{3-x}O_4$ that have been reported to exist over the range $0<x<0.4$ by N. K. Appandairajan et al in the Journal of Power Sources, Volume 40, pages 117–121 (1981), as the protective coating. The protective layers or coatings need not be uniform or homogeneous; indeed it has been found that the layers or coatings can be comprised of individual or interconnected grains that are fused to the surface of the bulk spinel particles. Therefore in a preferred embodiment, the invention includes lithium spinel oxides $LiM'O_4$ or lithiated $LiM_2O_4$ spinel oxides $Li_{1+y}M'_2O_4$ ($0<y\leq1$) in which M' can be selected from lithium and/or cobalt on the surface of the $LiMn_{2-x}M_xO_4$ electrode.

It is known in the art of lithium battery technology that $LiMn_2O_4$ spinel electrodes can be stabilized by substituting $Co^{2+}$ or $Co^{3+}$ ions for the $Mn^{4+/3+}$ ions in the bulk of the spinel structure, thereby reducing the concentration of $Mn^{3+}$ ions in the spinel framework and increasing the stability of the spinel electrode. Such Co-stabilized spinels can be represented as $Li[Mn_{2-x}Co_x]O_4$ in which x can be typically 0.15 or less, preferably 0.05 or less. Therefore, in a yet a further embodiment of this invention, these stabilized spinels can be used to good effect by introducing a concentration gradient of cobalt in the spinel framework, which increases from a low concentration at the center of the electrode particle (e.g., with composition $[Mn_{1.85}Co_{0.15}]O_4$) to a high concentration at the surface (e.g., $[Co_2]O_4$). The gradual change in lattice parameter of the spinel electrode associated with change in Co concentration, it is believed will contribute to the structural stability of the electrode and to enhanced stability at the electrode surface.

The principles of this invention as described above can be extended to include other lithium spinel materials or lithiated spinels as the protective layer, for example, $LiM'_2O_4$ or $Li_{1+y}M'_2O_4$ spinel-related compounds in which M' is selected from one or more cations of lithium, titanium and manganese, such as the lithium spinel oxides $Li[Ti_{1.67}Li_{0.33}]O_4$ or $Li[Mn_{1.67}Li_{0.33}]O_4$, that have lattice parameters of a=8.36 Å and a=8.14 Å, respectively, close to the typical lattice parameters of the $LiMn_{2-x}M_xO_4$ bulk spinel electrodes of this invention ($\leq8.24$ Å). It has already been well documented in the literature that many spinel oxides with a wide variety of compositions can be synthesized in the laboratory, such as those having cations with an atomic number less than 52 as reported by R. J. Hill et al in Phys. Chem. Minerals, Volume 4, pages 317 to 339 (1979). It is also well known in the art that lithium ions can be ion-exchanged with protons ($H^+$ ions) from typical electrolytes of lithium cells, thereby leading to the incorporation of the $H^+$ ions within the spinel electrode structure on storage and during the electrochemical operation of cells. In a particular embodiment, the invention includes Li-, Mg- or Al-substituted derivatives of the lithium spinel oxides $LiM'_2O_4$ or $Li_{1+y}M'_2O_4$ such as $Li[Ti_{1.67}Li_{0.33}]O_4$ or $Li[Mn_{1.67}Li_{0.33}]O_4$ as reported by C. H. Chen et al in the Journal of the Electrochemical Society, Volume 148(1), pages A102 to A103 (2001) to induce mixed valence character to the Ti and Mn transition metal cations and hence electronic conductivity to the spinel coating, examples for the lithium titanate spinel coating being $Li[Ti_{1.67+z}Li_{0.33-z}]O_4$, $Li[Ti_{1.67}Li_{0.33-z}Mg_z]O_4$ and $Li[Ti_{1.67}Li_{0.33-z}Al_z]O_4$ for the lithium manganate spinel coating being $Li[Mn_{1.67}Li_{0.33-z}Mg_z]O_4$ and $Li[Mn_{1.67}Li_{0.33-z}Al_z]O_4$ for $0<z<0.2$. A particular advantage of using $LiMn_{2-x}M_xO_4$, $LiM'_2O_4$ or $Li_{1+y}M'_2O_4$ lithium spinel oxides that contain some aluminum ions, titanium ions or zirconium ions is that these ions bond strongly to the oxygen framework of the spinel, thus providing additional structural stability to the electrode.

The following examples describe possible methods of synthesizing the coated lithium-metal oxide electrodes of this invention as contemplated by the inventors, but they are not to be construed as limiting examples.

EXAMPLE 1

Figure 2:
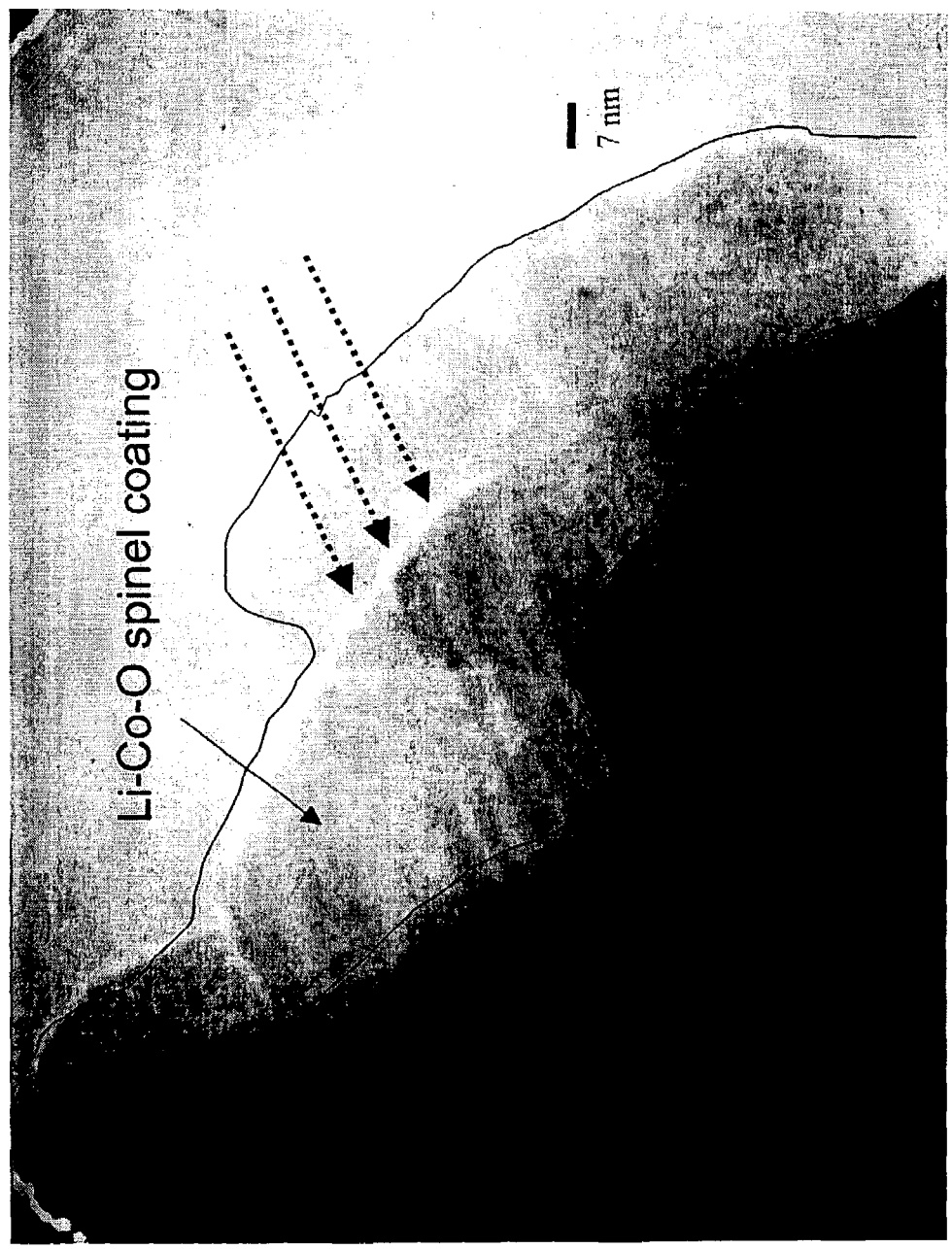
FIG. 2 depicts a transmission electron micrograph of the surface of a $Li_{1.03}Mn_{1.97}O_4$ electrode coated with a lithium-cobalt-oxide spinel, the X-ray diffraction pattern of which is shown in FIG. 1.

A sample of $Li_{1.03}Mn_{1.97}O_4$ spinel powder was suspended in methanol, to which was added a 1:1 molar ratio of lithium acetate and cobalt acetate, such that the $LiCoO_2$ content in the final electrode was 3 percent by weight. The mixture was thoroughly stirred. The methanol was removed by rotary evaporation. The resulting product was heat treated under flowing oxygen at 400° C. for 96 hours. The X-ray diffraction pattern of the lithium-cobalt-oxide-coated $Li_{1.03}Mn_{1.97}O_4$ sample is compared with the parent, uncoated $Li_{1.03}Mn_{1.97}O_4$ starting material, as shown in FIG. 1. FIG. 1 demonstrates that the X-ray diffraction pattern of the coated sample is effectively identical to that of the parent uncoated spinel material. A transmission electron microscope image of the Li—Co—O spinel coating on a Li—Mn—O spinel particle is shown in FIG. 2. An EDAX (Electron Dispersion Analysis of X-rays) analysis of the coating showed unequivocally that the surface coating contained cobalt and that the bulk of the electrode particle contained manganese. However, the applicants believe that diffusion of lithium, cobalt and manganese takes place within the close-packed oxygen array and at the phase boundaries during the coating process at 400° C. Therefore, concentration gradients at the coating/bulk interface of the electrodes. FIG. 2 clearly shows in broad outline the distinguishing boundary that connects the Li—Co—O spinel coating and the Li—Mn—O spinel in the bulk of the particle. FIG. 2 also demonstrates that the coating, when applied by the sol-gel technique, is not homogeneous or uniform, and that it is comprised of individual, but interconnected grains of Li—Co—O spinel that contain planar defects, the directions of which are indicated by the dotted arrows in FIG. 2.

EXAMPLE 2

Figure 3:
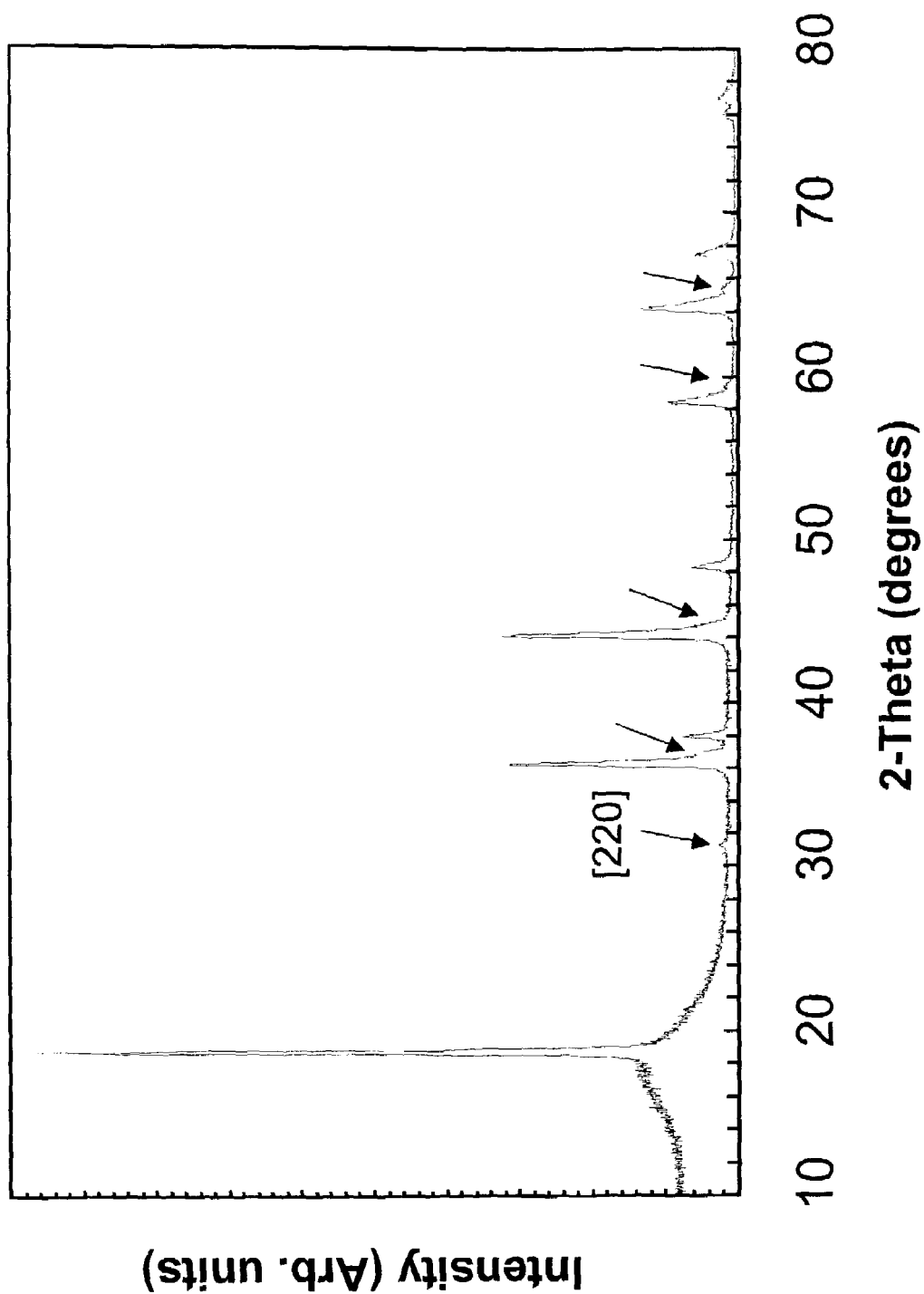
FIG. 3 depicts the powder X-ray diffraction pattern of a $Li_{1.03}Mn_{1.97}O_4$ electrode coated with a lithium-cobalt-oxide spinel, the coating prepared from octacarbonyldicobalt with 1–5 mole percent hexane stabilizer and lithium carbonate precursors at 400° C.

A sample of $Li_{1.03}Mn_{1.97}O_4$ spinel powder was suspended in hexane with rapid stirring. A predetermined quantity of octacarbonyldicobalt with 1–5 mole percent hexane as stabilizer, designated $Co_2(CO)_8.C_6H_{14}$, and $Li_2CO_3$ (Li:Co ratio=1:1) was used to fabricate a lithium-cobalt-oxide spinel coating such that the overall composition of the spinel electrode was $0.2LiCoO_2.0.8Li_{1.03}Mn_{1.97}O_4$. The $Co_2(CO)_8.C_6H_{14}$ was dissolved in hexane and added to the $LiMn_2O_4$ sample together with the required quantity of $Li_2CO_3$. The temperature was raised slowly to evaporate the hexane. The resulting product was then heat treated under flowing oxygen at 400° C. for 96 hrs. The X-ray diffraction pattern of the coated $Li_{1.03}Mn_{1.97}O_4$ sample is shown in FIG. 3. This X-ray diffraction pattern provides evidence of the coated $Li_{1.03}Mn_{1.97}O_4$ sample as well as a detectable amount of a spinel-related $Li_xCo_{3-x}O_4$ product, as evident from the weak [220] peak at approximately 31.5° 2θ and peak shoulders (arrowed) that are located to the right of the coated $Li_{1.03}Mn_{1.97}O_4$ peaks. The detection of a $Li_xCo_{3-x}O_4$ product in the electrode sample is attributed to the relatively high concentration of cobalt precursor used in Example 2 compared with Example 1.

EXAMPLE 3

Standard spinel electrodes of approximate composition $Li_{1.03}Mn_{1.97}O_4$, and those that had been coated with lithium cobalt oxides with spinel-related structures at a moderate temperature (400° C.), were evaluated in coin cells (size 2032, with dimensions 20 mm diameter and 3.2 mm high) against a counter lithium electrode. The cells had the configuration: Li/1M $LiPF_6$ in ethylene carbonate (EC), diethyl carbonate (DEC) (1:1)/$Li_{1.03}Mn_{1.97}O_4$. Electrodes were fabricated with approximately 7 to 10 mg of the spinel powder, i.e., approximately 82% by weight of the laminate electrode, intimately mixed with approximately 10% by weight of a polyvinylidene difluoride binder (Kynar or Kureha-type PVDF polymer) and approximately 8% by weight of carbon (graphite, such as Timcal SFG-6, or acetylene black, such as Chevron XC-72) in 1-methyl-2-pyrrolidinone (NMP). The slurries were coated with a doctor blade onto an aluminum foil substrate current collector. The electrode laminates were dried under vacuum at temperatures from 40 to 110° C.; electrodes of suitable size were punched from these laminates to fit the coin cells. Metallic lithium foil was used as the counter electrode. The coin cells were discharged and charged at constant current (typically 0.1 mA/cm$^2$) within the voltage range 4.3 to 3.3 V.

Figure 4:
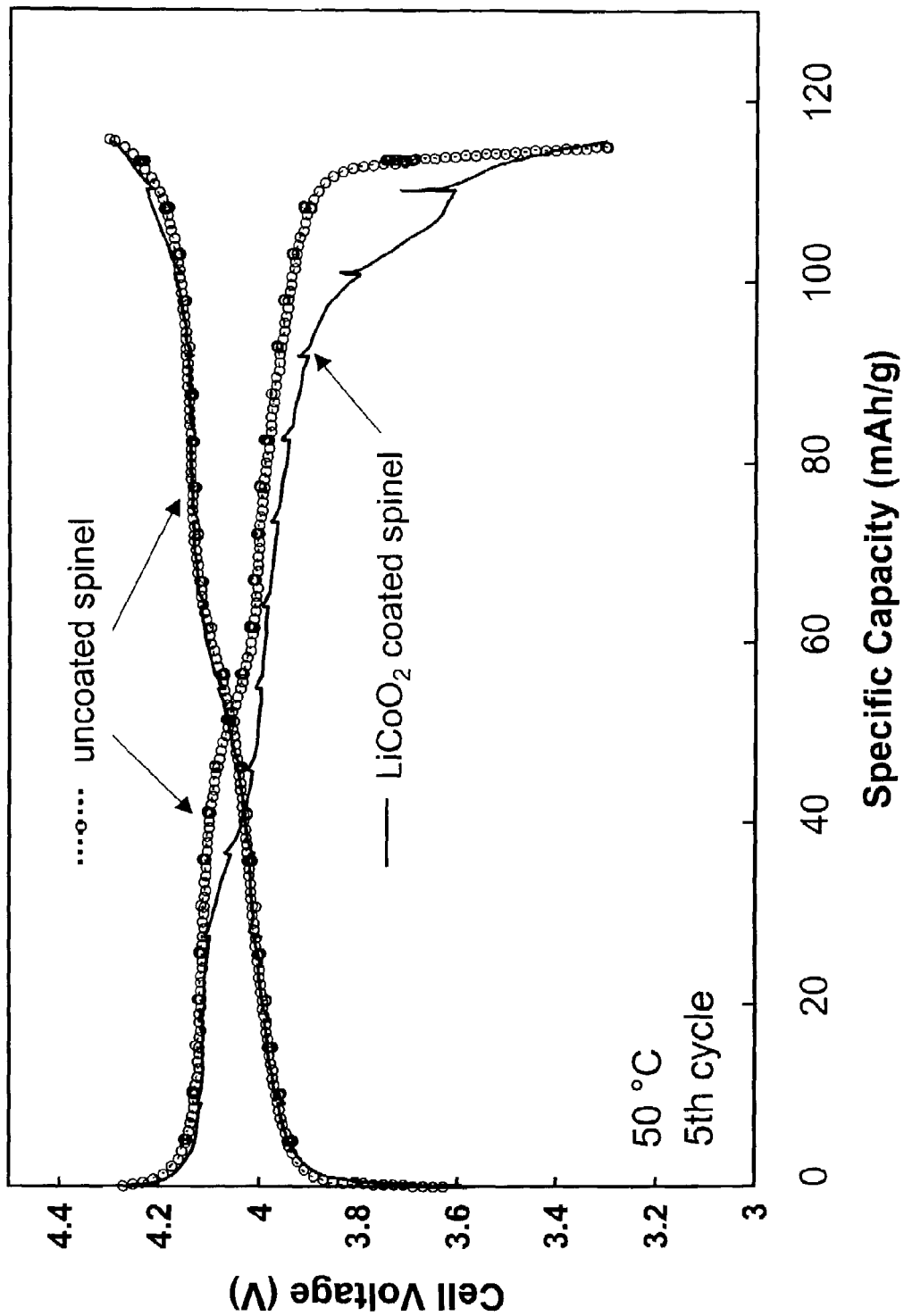
FIG. 4 depicts the electrochemical profile of a standard $Li/Li_{1.03}Mn_{1.97}O_4$ cell and a $Li/Li_{1.03}Mn_{1.97}O_4$ cell in which the $Li_{1.03}Mn_{1.97}O_4$ electrode was coated with $LiCoO_2$ by a sol-gel method at 400° C.

The electrochemical voltage profiles, obtained on the fifth cycle between 4.3 and 3.3 V at 50° C., of a standard Li/$Li_{1.03}Mn_{1.97}O_4$ cell and a Li/$Li_{1.03}Mn_{1.97}O_4$ cell in which the spinel electrode had been coated by the sol-gel method described in Example 1 are provided in FIG. 4. The voltage profile of the cell with a coated spinel electrode shows a short plateau at approximately 3.6 V, which is absent in the profile of the standard Li/$Li_{1.03}Mn_{1.97}O_4$ cell; this feature is consistent with the electrochemical behavior of $LiCoO_2$ with a spinel-related structure $Li_2[Co_2]O_4$, synthesized at 400° C.

Figure 5:
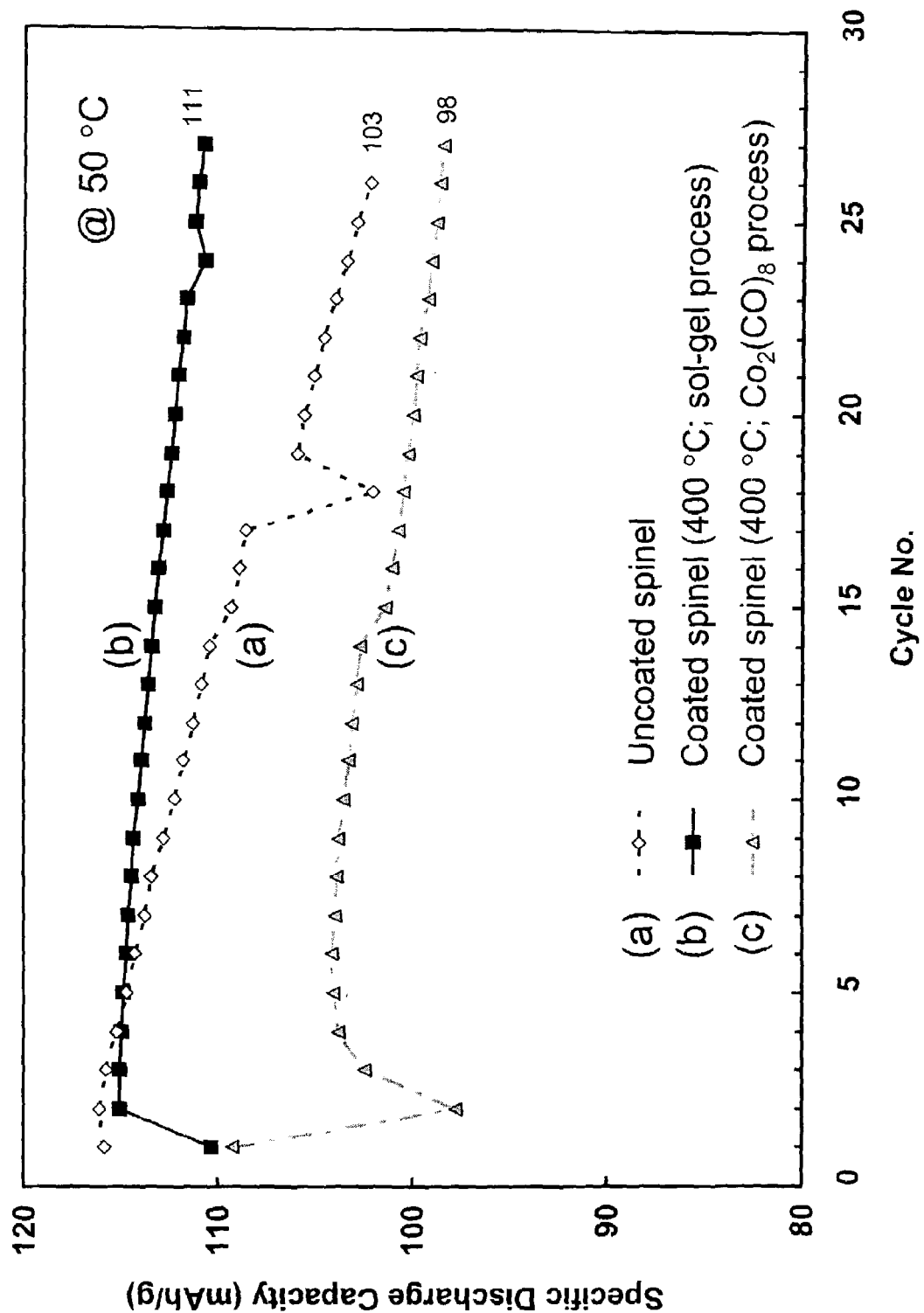
FIG. 5(a)–(c) depict plots of electrode capacity vs. cycle number of a) a standard $Li/Li_{1.03}Mn_{1.97}O_4$ cell and b) and c) $Li/Li_{1.03}Mn_{1.97}O_4$ cells in which the $Li_{1.03}Mn_{1.97}O_4$ electrode was coated with a lithium-cobalt-oxide spinel.
Figure 6:
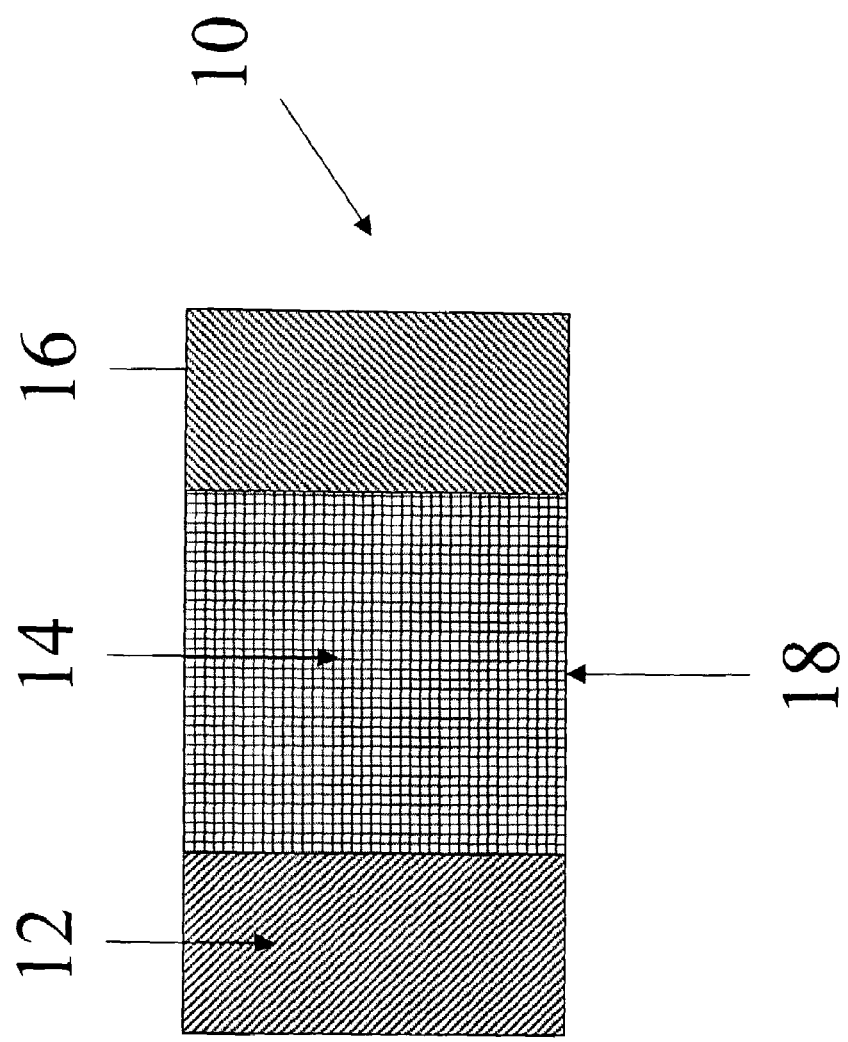
FIG. 6 depicts a schematic illustration of an electrochemical cell.
Figure 7:
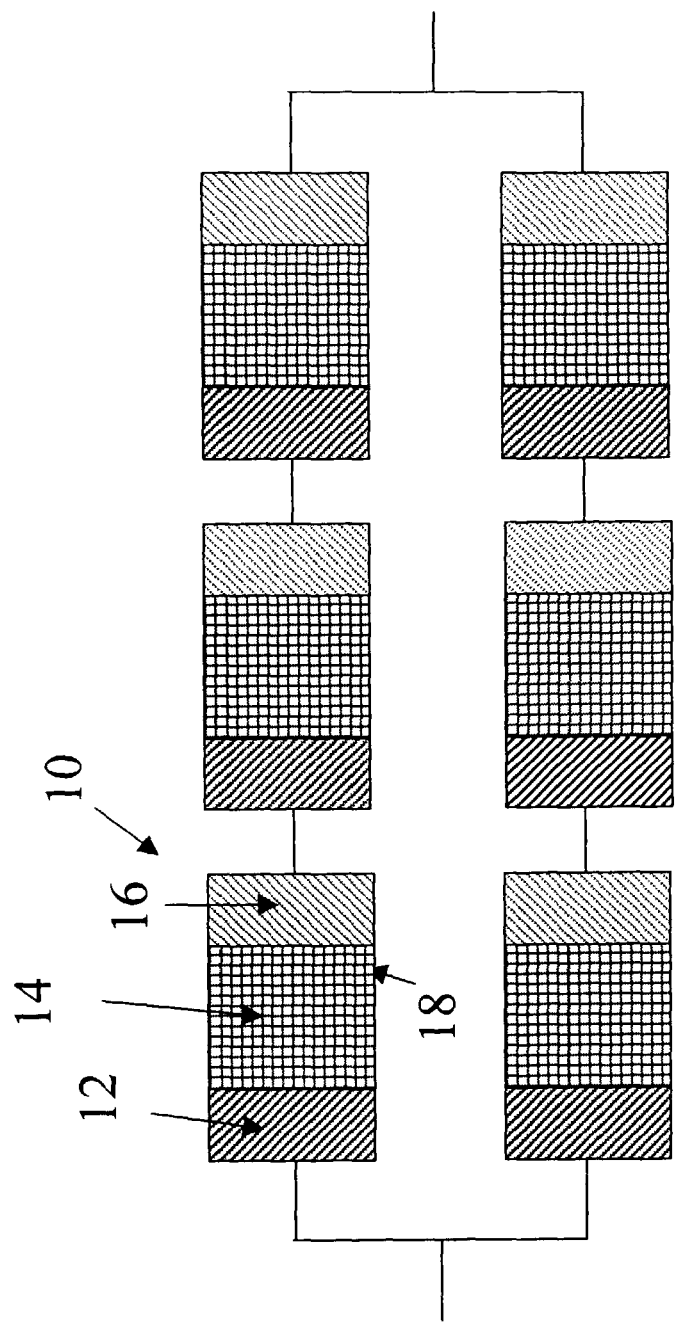
FIG. 7 depicts a schematic illustration of an example of a battery employing the cells of the invention.

FIG. 5 shows plots of electrode discharge capacity versus cycle number for lithium cells that contained the standard, uncoated $Li_{1.03}Mn_{1.97}O_4$ electrode and the coated electrodes of Examples 1 and 2. The data in FIG. 5 indicate that at 50° C. the rate of capacity fade of the coated electrodes is significantly less than that of the standard electrode, thereby demonstrating the effectiveness of the coating. The theoretical capacity of the coated spinel electrode of Example 1, taking into account the capacity of the electrochemically active $LiCoO_2$ coating, is 140 mAh/g. After 25 cycles at 50° C., this coated electrode delivers a discharge capacity of approximately 111 mAh/g (i.e., 79% of its theoretical capacity), in contrast to 103 mAh/g delivered by the standard spinel electrodes, which is 76% of its theoretical capacity (136 mAh/g). Of major significance, however, is that the rate of capacity fade of the coated electrode for the first 25 cycles is 0.14% per cycle, whereas for the standard electrodes it is 0.50% per cycle.

Although FIG. 5 shows that the capacity of the coated electrode of Example 2 is less than that of the standard, uncoated $Li_{1.03}Mn_{1.97}O_4$ electrode, the inferior capacity of the coated electrode is attributed to the relatively high cobalt content used for the coating that resulted in an appreciable amount of spinel-related $Li_xCo_{3-x}O_4$ in the electrode which does not contribute significantly to the capacity of the cells when charged and discharged between 4.3 and 3.3 V. Nevertheless, the rate of capacity fade of the coated electrode of Example 2 is significantly superior to that of the standard, uncoated $Li_{1.03}Mn_{1.97}O_4$ electrode. Moreover, the rate of capacity fade of the coated electrode of Example 2 is essentially the same as the rate of capacity fade of the coated electrode of Example 1 as reflected by the closely parallel slopes of their capacity vs. cycle number plots in FIG. 5. Therefore, the inventors believe that the practical capacity of coated electrodes made in accordance with the method of Example 2 will be increased by reducing the amount of $Co_2(CO)_8 \cdot C_6H_{14}$ and $Li_2CO_3$ precursors used for making the Li—Co—O coating.

The examples and data provided above demonstrate the principles of this invention. In particular, they show that improved electrochemical performance of a non-aqueous lithium cell can be achieved by coating a $LiMn_2O_4$ spinel positive electrode with a lithium-containing spinel compounds that are structurally compatible with, but compositionally different from the structure of the bulk $LiMn_2O_4$ spinel electrode, to provide a good lattice match between the bulk electrode structure and the structure of the electrode coating, and to protect the spinel electrode in the bulk from capacity loss effects, such as oxygen loss and/or manganese dissolution during the electrochemical cycling of lithium-ion cells.

This invention, therefore, relates to positive electrodes for a non-aqueous electrochemical lithium cell, as shown schematically in FIG. 13, the cell represented by the numeral 10 having a negative electrode 12 separated from a positive electrode 16 by an electrolyte 14, all contained in an insulating housing 18 with suitable terminals (not shown) being provided in electronic contact with the negative electrode 12 and the positive electrode 16. Binders and other materials normally associated with both the electrolyte and the negative and positive electrodes are well known in the art and are not described herein, but are included as is understood by those of ordinary skill in this art. FIG. 14 shows a schematic illustration of one example of a battery in which two strings of electrochemical lithium cells, described above, are arranged in parallel, each string comprising three cells arranged in series.

While there has been disclosed what is considered to be the preferred embodiments of the present invention, it is understood that various changes in the details may be made without departing from the spirit, or sacrificing any of the advantages of the present invention and that additional improvements in the capacity and stability of the electrodes can be expected to be made in the future by improving and optimizing the processing techniques whereby electrodes are coated with protective layers.

The embodiments of the invention in which an exclusive property or privilege is claimed are defined as follows:

1. A positive electrode for a non-aqueous lithium cell comprising a $LiMn_{2-x}M_xO_4$ spinel structure in which M is one or more cations with an atomic number less than 52, such that the average oxidation state of the manganese ions is equal to or greater than 3.5, and in which $0 \leq x \leq 0.15$, having one or more lithium spinel oxide $LiM'_2O_4$ or lithiated spinel oxide $Li_{1+y}M'_2O_4$ compounds on the surface thereof in which M' are cobalt cations and in which $0 \leq y \leq 1$.

2. An electrode according to claim 1 in which in which M is one or more metal cations with an atomic number less than 33.

3. An electrode according to claim 1 in which M is selected from the group consisting of, $Li^+$, $Mg^{2+}$, $Co^{2+}$, $Al^{3+}$, $Co^{3+}$, $Ti^{4+}$ and $Zr^{4+}$ cations.

4. The positive electrode of claim 1, wherein the lithium spinel oxide or lithiated spinal oxide is present as a coating.

5. The positive electrode of claim 1, wherein the concentration of M' cations increases from the center to the surface of the electrode.

6. An electrode according to claim 1, in which M cations are cobalt.

7. An electrode according to claim 6, in which the $Li_{1+y}M'_2O_4$ compound is $Li_2Co_2O_4$.

8. An electrode according to claim 1, in which $Li^+$ cations are partially substituted by $H^{3O}$ cations.

9. The positive electrode of claim 1, wherein the lithium spinel oxide $LiM'_2O_4$ or lithiated spinel oxide $Li_{1+y}M'_2O_4$ compounds are present as a coating.

10. The positive electrode of claim 1, wherein the concentration of M' cations increases from the center to the surface of the electrode.

11. A positive electrode for a non-aqueous lithium cell comprising a $LiMn_{2-x}M_xO_4$ spinel structure in which M is one or more metal cations with an atomic number less than 52, such that the average oxidation state of the manganese ions is equal to or greater than 3.5, and in which $0 \leq x \leq 0.15$, having a lithiated spinel compound $Li_xCo_{3-x}O_4$ for $0<x<0.4$ and $y=0$ on the surface thereof.

12. A non-aqueous lithium electrochemical cell comprising a negative electrode, an electrolyte and a positive electrode, the positive electrode comprising a $LiMn_{2-x}M_xO_4$ spinel structure in which M is one or more metal cations with an atomic number less than 52, such that the average oxidation state of the manganese ions is equal to or greater than 3.5, and in which $0 \leq x \leq 0.15$, having one or more lithium spinel oxide $LiM'_2O_4$ or lithiated spinel oxide $Li_{1+y}M'_2O_4$ compounds on the surface thereof in which M' are cobalt cations and in which $0 \leq y \leq 1$.

13. A non-aqueous lithium battery comprising a plurality of electrochemical cells, electrically connected, each cell comprising a negative electrode, an electrolyte and a positive electrode, the positive electrode comprising a $LiMn_{2-x}M_xO_4$ spinel structure in which M is one or more metal cations with an atomic number less than 52, such that the average oxidation state of the manganese ions is equal to or greater than 3.5, and in which $0 \leq x \leq 0.15$, having one or more lithium spinel oxide $LiM'_2O_4$ or lithiated spinel oxide $Li_{1+y}M'_2O_4$ compounds on the surface thereof in which M' are cobalt cations and in which $0 \leq y \leq 1$.

* * * * *

UNITED STATES PATENT AND TRADEMARK OFFICE
CERTIFICATE OF CORRECTION

PATENT NO. : 7,049,031 B2 Page 1 of 1
APPLICATION NO. : 10/353385
DATED : May 23, 2006
INVENTOR(S) : Christopher S. Johnson et al.

It is certified that error appears in the above-identified patent and that said Letters Patent is hereby corrected as shown below:

IN THE ABSTRACT

(57) Line 5, delete "$0 \leq x \leq$" and insert --$0 \leq x \leq$--.
Line 6, delete "spine" and insert --spinel--.
Line 8, delete "$0 \leq y \leq 1$" and insert --$0 \leq y \leq 1$--.

IN THE CLAMS:

Claim 1, column 8, line 56, after the word "more" insert --metal--.
line 58, delete "$0 \leq x \leq 0.5$" and insert --$0 \leq x \leq 0.5$--.
line 61, delete "$0 \leq y \leq 1$" and insert --$0 \leq y \leq 1$--.

Claim 8, column 9, line 11, delete "$H^{30}$" and insert --$H^+$--.

Claim 11, column 9, line 22, delete "$0 \leq x \leq 0.15$" and insert --$0 \leq x \leq 0.15$--.

Claim 12, column 10, line 7, delete "$0 \leq x \leq 0.15$" and insert --$0 \leq x \leq 0.15$--.
line 10, delete "$0 \leq y \leq 1$" and insert --$0 \leq y \leq 1$--.

Claim 13, column 10, line 19, delete "$0 \leq x \leq 0.15$" and insert --$0 \leq x \leq 0.15$--.
line 22, delete "$0 \leq y \leq 1$" and insert --$0 \leq y \leq 1$--.

Signed and Sealed this

Twenty-first Day of November, 2006

JON W. DUDAS
*Director of the United States Patent and Trademark Office*